Aug. 11, 1970     A. RUTTKAY ET AL     3,524,112

GAS EMITTING STRUCTURE FOR AN ELECTROLYTIC CIRCUIT COMPONENT

Filed Feb. 14, 1968

INVENTOR

Adam Ruttkay
Niels Smidtpeldt

BY Watson, Cole, Grindle + Watson

ATTORNEY

United States Patent Office 3,524,112
Patented Aug. 11, 1970

3,524,112
GAS EMITTING STRUCTURE FOR AN
ELECTROLYTIC CIRCUIT COMPONENT
Adam Ruttkay, Copenhagen, and Niels Hvidtfeldt, Virum,
Denmark, assignors to A/S Wicon Kondensatorfabrik,
Copenhagen, Denmark, a corporation of Denmark
Filed Feb. 14, 1968, Ser. No. 705,338
Claims priority, application Denmark, Feb. 14, 1967
798/67
Int. Cl. H01g 9/12
U.S. Cl. 317—230  2 Claims

ABSTRACT OF THE DISCLOSURE

To permit the escape of gases from electrolytic capacitors or other electrical circuit components containing electrolytes, while preventing the escape of electrolyte, the cylindrical casing of a capacitor or other component is provided with a plurality of vent openings covered by a material impervious to fluid electrolyte but permitting gas to escape by diffusion or other form of migration, the openings being so located that in any position of the capacitor or other component at least one opening will always be free from electrolyte. Preferably the material covering the openings is constituted by an extremely thin plastic tape adhering to the circumferential surface of the casing at a distance from the openings.

BACKGROUND OF THE INVENTION

The invention relates to an electrical circuit component containing an electrolyte.

It has always been and is also at the present time a problem, that certain electrical circuit components containing an electrolyte, as for instance electrolytic capacitors, dry cells and accumulators release hydrogen or other gases during operation.

Such components are often placed under conditions, where fluid electrolyte leaked out from the component will damage the surroundings, e.g. by spoiling the insulation of electrical circuits.

It is quite common that small amounts of electrolyte are released from the active part of the component and this fluid will be collected at the lowest part of the encapsulating case.

If, therefore, a vent is introduced in the capsule to relieve it of gas pressure, when this reaches a critical value, such a vent will also let out part of the electrolytic fluid with certain positions of the component.

The most commonly used venting device for electrolytic capacitors is a circular membrane of rubber, neoprene or similar material with a diameter of 1–5 mm. and a thickness of 0.5–2 mm. Such membranes are produced in sealing discs, which are made from laminated insulating material with a glued-on rubber layer by cutting a circular opening in the laminate without piercing the rubber layer.

The bursting pressure for such membrane vents may vary from about 4 to about 12 atmospheres.

The membrane serves not only for a pressure relief but acts by permitting hydrogen diffusion and the amount of hydrogen passing out this way may be quite substantial.

For instance, a membrane with a diameter of 3.5 mm. and a thickness of 1 mm. allows passage of more than 3 milliliters of hydrogen per hour, measured at atmospheric pressure. It is a condition for the passage of such quantities that the hydrogen pressure in the capacitor capsule is high, at any rate above 4 atmospheres and this elevated working pressure is disadvantageous because of explosion danger.

When considering the danger it should also be borne in mind, that a defective cutting in the material supporting the membrane may indicate that the vent is not acting at all and it is difficult to safeguard 100% against such a manufacturing fault.

It is also a disadvantage that the diffusion rate with decrease considerably if the membrane is covered by a layer of electrolyte fluid.

This fact is demonstrated when the capacitor is exposed to extreme working conditions for a long time, as for example during accelerated life tests.

If the membrane is turned upwards the diffusion may be sufficient, whereas the membrane often bursts during the test when turned downwards.

It has been proposed to make an opening in the capacitor permitting free passage of gas and simultaneously filling up the space between the active part of the component and the pierced capsule with rigid plastic foam. This design may be suitable in some cases, but experiments show, that the foam does not always protect fully against electrolyte leakage and at elevated working temperatures the evaporation of electrolyte ingredients is not adequately inhibited.

It is the purpose of the present invention to provide a venting device for an electrolytic capacitor or similar apparatus enclosed in a cylindrical container which device comprises openings placed in the curved surface of the container, which openings are covered by a material permitting dicusion or oozing of gases, the diffusion rate being adequate no matter how the capacitor is situated in the equipment.

SUMMARY OF THE INVENTION

The foregoing advantages are obtainde according to the invention by using more than one opening, these openings being placed so that they can not all at the same time be covered by electrolytic fluid. One opening will always be uncovered and permit sufficient diffusion of the gases released during action.

Said openings are covered up by glued-on or clamped-on material permitting passage of hydrogen by diffusion or other sort of oozing through this material, but blocking the passage of electrolyte until the pressure in the container exceeds a critical value depending on the nature and thickness of the material.

DESCRIPTION OF THE PREFERRED EMBODIMENTS

Figure 1:
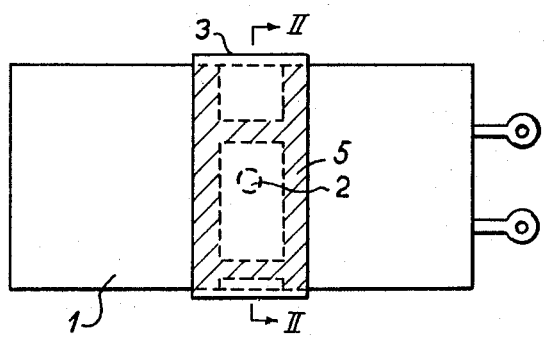
FIG. 1 is a side view on an enlarged scale of a capacitor constructed in accordance with one embodiment of the invention.

In the embodiment of FIG. 1, two small, circular openings 2 are placed opposite to each other in the casing 1 of the capacitor. Said openings 2 are covered by thin plastic foil 3 which is glued on the capacitor casing externally. The gluing is restricted to the shaded areas 5.

A material permitting rapid diffusion of hydrogen is polycarbonate foil with a thickness of about 0.02 mm.

During operation the capacitors are usually fixed in positions such that the generatrices of the curved surface are vertical. Both openings 2 will then be unaffected by electrolyte. With the capacitor in a horizontal position at least one of the openings 2 will be free from electrolyte collection.

Figure 3:
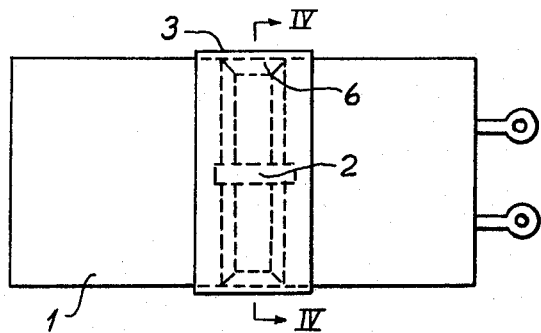
FIG. 3 is a view similar to FIG. 1 of a capacitor constructed in accordance with another embodiment of the invention.
Figure 4:
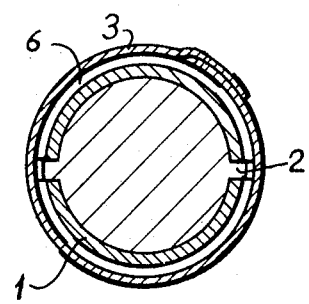
FIG. 4 a cross-section following the line IV—IV in FIG. 3.

The FIGS. 3 and 4 show an embodiment especially suitable for mass production.

In the cylindrical container an annular groove 6 is pressed, e.g. 0.5 mm. deep and 5 mm. wide.

It is to be noted that some features are exaggerated and certain details are out of proportion for the sake of illustration.

In two opposite places of the groove 6 openings are provided e.g. by making short cuts across the groove. Then the groove 6 is covered by an adhesive plastic tape 3.

This tape could e.g. have a thickness 0.025 mm. and width 20 mm. The material could be polyethylene terephtalate covered by an adhesive layer of a pressure sensitive, thermosetting glue.

After fixing the tape the container undergoes a heat treatment in order to cure the thermosetting glue, thereby increasing the strength of connection between tape and container.

When increasing the internal container pressure to 4–5 atmospheres the pressure is relieved and gas blows out, the tape being extended so that it partially slips away from the container surface.

Instead of using a coherent groove it may be suitable to apply depressions covering some area surrounding each opening 2 of the container.

Said embodiments of the invention also protect against danger of explosion caused by vapour pressure of the electrolyte if the capacitor is heated abnormally, e.g. by electrical overload.

The external taping may sometimes be made so wide that it is at the same time acting as an electrically insulating cover of the capacitor casing, which is most commonly made from aluminium.

An important advantage of the invention is the high diffusion rate for hydrogen attained because the membrane material has a large surface and a much smaller thickness than in the usual vents.

The diffusion rate can be adapted to any demand.

Figure 2:
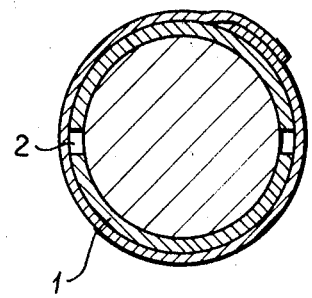
FIG. 2 shows a cross-section following the line II—II in FIG. 1.

In the embodiment shown in FIGS. 3 and 4, the area of the tape 3 at disposal for diffusion is much larger than the area of the case-openings. This applies also to an embodiment according to FIGS. 1 and 2, where the tape 3 is glued to the surface of the casing at a distance from the edges of openings 2.

Some opening will always connect the interior of the casing to the diffusion area.

Among the operational conditions for electrolytic capacitors calling especially for hydrogen venting facilities reference may be made to pulse discharge capacitors for welding equipment and energy storage capacitors for professional photo flash equipment. The hydrogen release is accelerated when the capacitor is exposed to a rapid succession of discharges as may be the case in equipment for professional photographers and for scientific purposes.

If some hydrogen is accumulated in the capacitor container during operation it will disappear again during idle intervals.

The rapid diffusion is not conditioned by an essential increase of internal pressure.

For the special purposes stated here the invention will be contributing greatly to the reliability of the equipment.

What is claimed is:

1. An electrical circuit component containing a gas evolving electrolyte, comprising:
   a casing of impervious material enclosing said electrolyte,
   said casing including at least two apertures having a size enabling free escape of gas from said casing,
   a thin plastic tape impervious to electrolyte for diffusing said gas attached to the surface of said casing to cover said apertures at a distance from the edges thereof to prevent free communication between said apertures and the surrounding environment at normal internal pressures within said casing and provide an area exposed to gas escaping through said apertures, said area is greater than the flow area of said apertures, and said tape attachment rupturing at abnormal internal pressures within said casing.

2. An electrical component as in claim 1 wherein said casing is cylindrical and said apertures are provided in a circumferentially extending groove in said casing.

References Cited

UNITED STATES PATENTS

| | | | |
|---|---|---|---|
| 812,968 | 2/1906 | Williams | 317—230 |
| 1,997,185 | 4/1935 | Sprague et al. | 317—230 |
| 2,183,091 | 12/1939 | Claassen et al. | 317—230 |
| 2,628,271 | 2/1953 | Brafman | 317—230 |
| 2,806,982 | 9/1957 | Holik et al. | 317—230 |

JAMES D. KALLAM, Primary Examiner

U.S. Cl. X.R.

317—233